(12) United States Patent
Kopietz

(10) Patent No.: US 10,362,320 B2
(45) Date of Patent: Jul. 23, 2019

(54) SYSTEMS AND METHODS FOR RENDERING AND PRE-ENCODED LOAD ESTIMATION BASED ENCODER HINTING

(71) Applicant: ZeniMax Media Inc., Rockville, MD (US)

(72) Inventor: Michael Kopietz, Frankfurt (DE)

(73) Assignee: ZeniMax Media Inc., Rockville, MD (US)

( * ) Notice: Subject to any disclaimer, the term of this patent is extended or adjusted under 35 U.S.C. 154(b) by 0 days.

(21) Appl. No.: 15/958,610

(22) Filed: Apr. 20, 2018

(65) Prior Publication Data

US 2018/0309811 A1 Oct. 25, 2018

Related U.S. Application Data

(60) Provisional application No. 62/488,526, filed on Apr. 21, 2017, provisional application No. 62/647,180, (Continued)

(51) Int. Cl.
*H04N 19/192* (2014.01)
*H04N 19/176* (2014.01)
(Continued)

(52) U.S. Cl.
CPC ........... *H04N 19/192* (2014.11); *A63F 13/86* (2014.09); *H04L 65/601* (2013.01);
(Continued)

(58) Field of Classification Search
CPC .................................................... H04N 19/198
See application file for complete search history.

(56) References Cited

U.S. PATENT DOCUMENTS 6,903,662 B2  6/2005 Rix et al.
7,844,002 B2  11/2010 Lu et al.
(Continued)

FOREIGN PATENT DOCUMENTS

CN  105163134 B  9/2018
CN  105264888 B  9/2018
(Continued)

OTHER PUBLICATIONS

Ryan Shea et al., Cloud Gaming: Architecture and Performance, Jul./Aug. 2013, IEEE Network, pp. 16-21.*
(Continued)

*Primary Examiner* — Esther B. Henderson
(74) *Attorney, Agent, or Firm* — Blank Rome LLP

(57) ABSTRACT

Systems and methods for hinting an encoder are disclosed in which a server monitors for information related to changes in frame rendering, calculates tolerance boundaries, rolling average frame time, and short-term trends in frame time, and uses those calculations to identify a frame time peak. The server then hints a codec (encoder) to modulate the quality settings of frame output in proportion to the size of the frame time peak. In certain embodiments, a renderer records one or more playthroughs in a game environment, sorts a plurality of frames from one or more playthroughs into a plurality of cells on a heatmap, and collects the list of sorted frames. A codec may then encode one or more frames from the list of sorted frames to calculate an average encoded frame size for each cell in the heatmap, and associate each average encoded frame size with a per-cell normalized encoder quality setting.

10 Claims, 5 Drawing Sheets

Related U.S. Application Data filed on Mar. 23, 2018, provisional application No. 62/655,901, filed on Apr. 11, 2018.

(51) Int. Cl.

| | | |
|---|---|---|
| *H04N 19/126* | (2014.01) | |
| *H04N 19/146* | (2014.01) | |
| *A63F 13/86* | (2014.01) | |
| *H04L 29/06* | (2006.01) | |
| *H04N 19/124* | (2014.01) | |
| *H04N 19/162* | (2014.01) | |

(52) U.S. Cl.
CPC .......... *H04L 65/602* (2013.01); *H04L 65/607* (2013.01); *H04L 65/608* (2013.01); *H04L 65/80* (2013.01); *H04N 19/124* (2014.11); *H04N 19/126* (2014.11); *H04N 19/146* (2014.11); *H04N 19/162* (2014.11); *H04N 19/176* (2014.11)

(56) References Cited

U.S. PATENT DOCUMENTS

| | | |
|---|---|---|
| 8,069,258 B1 | 11/2011 | Howell |
| 8,154,553 B2 | 4/2012 | Peterfreund |
| 8,678,929 B1 | 3/2014 | Nishimura et al. |
| 8,873,636 B2 | 10/2014 | Iwasaki |
| 9,358,466 B2 | 6/2016 | Kruglick |
| 9,609,330 B2 | 3/2017 | Puri et al. |
| 9,661,351 B2 | 5/2017 | Laan |
| 9,665,334 B2 | 5/2017 | Iwasaki |
| 9,697,280 B2 | 7/2017 | Maharajh et al. |
| 9,705,526 B1 | 7/2017 | Veernapu |
| 9,736,454 B2 | 8/2017 | Hannuksela et al. |
| 9,749,642 B2 | 8/2017 | Sullivan et al. |
| 9,762,911 B2 | 9/2017 | Puri et al. |
| 9,762,919 B2 | 9/2017 | Cote et al. |
| 9,774,848 B2 | 9/2017 | Jayant et al. |
| 9,807,416 B2 | 10/2017 | Kuusela |
| 9,961,349 B2 | 5/2018 | Owen |
| 9,998,516 B2 | 6/2018 | Brueck et al. |
| 10,009,625 B2 | 6/2018 | Kuusela |
| 10,045,053 B1 | 8/2018 | Wu et al. |
| 10,063,866 B2 | 8/2018 | Kudana et al. |
| 10,083,234 B2 | 9/2018 | Maharajh et al. |
| 2004/0036716 A1 | 2/2004 | Jordahl |
| 2006/0230428 A1 | 10/2006 | Craig et al. |
| 2009/0046593 A1 | 2/2009 | Ptasinski et al. |
| 2011/0261885 A1 | 10/2011 | de Rivaz |
| 2011/0294566 A1 | 12/2011 | Cardno et al. |
| 2015/0092856 A1 | 4/2015 | Mammou et al. |
| 2015/0117524 A1* | 4/2015 | Rondao Alface .... H04N 19/187 375/240.08 |
| 2015/0208069 A1 | 7/2015 | Zheng et al. |
| 2015/0228106 A1 | 8/2015 | Laksono |
| 2016/0198166 A1 | 7/2016 | Kudana et al. |
| 2016/0228776 A1 | 8/2016 | Miura et al. |
| 2016/0295216 A1 | 10/2016 | Aaron et al. |
| 2017/0105004 A1 | 4/2017 | Chen et al. |
| 2017/0132830 A1 | 5/2017 | Ha et al. |
| 2017/0155910 A1 | 6/2017 | Owen |
| 2017/0200253 A1 | 7/2017 | Ling |
| 2017/0208328 A1 | 7/2017 | Kuusela |
| 2017/0278296 A1 | 9/2017 | Chui et al. |
| 2017/0347044 A1 | 11/2017 | Douady-Pleven et al. |
| 2018/0098083 A1* | 4/2018 | McAllister .......... H04N 19/513 |
| 2018/0133599 A1 | 5/2018 | Lang |
| 2018/0176285 A1 | 6/2018 | Asarikuniyil et al. |
| 2018/0234682 A1 | 8/2018 | Owen |

FOREIGN PATENT DOCUMENTS

| | | |
|---|---|---|
| EP | 1820281 B2 | 8/2017 |
| JP | H6121518 A | 4/1994 |
| JP | H6129865 A | 5/1994 |
| KR | 20180054717 A | 5/2018 |
| WO | WO-2009138878 A2 | 11/2009 |
| WO | WO-2016172314 A1 | 10/2016 |
| WO | WO-2017058635 A1 | 4/2017 |
| WO | WO-2018136170 A1 | 7/2018 |

OTHER PUBLICATIONS

Canossa et al., "G-Player Exploratory Visual Analytics for Accessible Knowledge Discovery," DIGRA/FDG, Aug. 2016, retrieved from https://www.researchgate.net/profile/Truong_Huy_Nguyen/publication/305349078_G_Player_Exploratory_Visual_Analytics_for_Accessible_Knowledge_Discovery/links/5789a5dd08ae7a588ee873c1/G-Player-Exploratory-Visual-Analytics-for-Accessible-Knowledge-Discovery.pdf> entire document.

https://www.researchgate.net/profile/Truong_Huy_Nguyen/publication/305349078_G_Player_Exploratory_Visual_Analytics_Knowledge_Discovery/links/5789a5dd08ae7a588ee873c1/G-Player-Exploratory-Visual-Analytics-for-Accessible-Knowledge-Discovery.pdf> entire document.

Wang, Z. et al., "Image Quality Assessment: From Error Visibility to Structural Similarity," IEEE Transactions on Image Processing, 13(4), pp. 600-612, Apr. 2004.

Moorthy, A.K., "Efficient Motion Weighted Spatio-Temporal Video SSIM Index," Human Vision and Electronic Imaging XV, vol. 7527, Mar. 2010,(http://live.ece.utexas.edu/publications/2010/moorthy_spie_jan10.pdf).

BGR Microsoft Article, http://bgr.com/2018/03/16/microsoft-netflix-for-games-subscription-cloud/.

Verge's Article on Blade Technology, https://www.theverge.com/2018/2/21/17029934/blade-shadow-us-launch-netflix-for-pc-games-cloud-streaming-windows-10.

Parsec TechCrunch Article, <https://techcrunch.com/2017/12/19/is-the-time-finally-right-for-platform-agnostic-cloud-gaming/>.

* cited by examiner

SYSTEMS AND METHODS FOR RENDERING AND PRE-ENCODED LOAD ESTIMATION BASED ENCODER HINTING

RELATED APPLICATIONS

This application claims the benefit of the following U.S. Provisional Applications: No. 62/488,526, filed Apr. 21, 2017, No. 62/647,180, filed Mar. 23, 2018, and No. 62/655,901, filed Apr. 11, 2018.

BACKGROUND OF THE INVENTION

Remote gaming applications, in which a server-side game is controlled by a client-side player, have attempted to encode the video output from a three-dimensional (3D) graphics engine in real-time using existing or customized encoders. However, the interactive nature of video games, particularly the player feedback loop between video output and player input, makes game video streaming much more sensitive to latency than traditional video streaming. Existing video coding methods can trade computational power, and little else, for reductions in encoding time. New methods for integrating the encoding process into the video rendering process can provide significant reductions in encoding time while also reducing computational power, improving the quality of the encoded video, and retaining the original bitstream data format to preserve interoperability of existing hardware devices.

On the first pass of a multi-pass encoding process, the cost of encoding or size of each encoded video frame is calculated before the data is efficiently packed to fit a bitrate constraint on successive passes. The benefits of multi-pass encoding are substantial, providing the highest possible quality for a bitrate constraint, but traditional multi-pass encoding requires access to the complete video file making it unsuitable for live streaming applications.

Live streaming applications typically use single-pass encoding since the video is not available in advance. The time constraints on live stream encoding impede the encoder's ability to efficiently pack the video information for a constrained bitrate. Because encoding costs are not calculated in a single-pass encode, the network traffic spikes when high-entropy frames are encoded.

Real-time rendered video is increasingly utilized in live streaming applications, like video game streaming, where high quality and constrained bandwidth are both highly valued. Rendered video, unlike recorded video, has access to additional information about each frame which can be re-used to estimate the cost of encoding the frame. In this manner, the results of a first pass in a multi-pass encoding scheme can be approximated to achieve the highest quality encoded video within a bitrate constraint. Many rendering engines have partial information about the images that will be rendered and may pre-generate encoder quality settings that can be used during runtime. In this manner, the benefits of a multi-pass encoding mode can be achieved in a live-streaming environment. However, as explained below, present computer technology remains deficient in estimating encoding quality to a sufficient degree to perform rendering of high-quality real-time rendered video while compensating for traffic spikes due to increased entropy. Moreover, there is no encoding technology that presently pre-encodes spatially, rather than temporally, replicating multi-pass encoding while remaining in a real-time environment.

U.S. Pat. No. 7,844,002 B2 ("the '002 Patent") discloses systems and methods for effectuating real-time MPEG video coding with information look-ahead in order to achieve a constant bit rate. The system is comprised of two video encoders, one of which delays the input by an amount of time relative to the other encoder's look-ahead window. In the system of the '002 Patent, one of the video encoders operates as a buffer (look-ahead) device, delaying the input video frames so that the second of the video encoders, acting as the information collector/processor, will have the time needed to extract relevant information and determine an encoding strategy for the video frames. Once that strategy is determined, the coding parameters are passed to the encoder device for execution. The technology of the '002 Patent is deficient in comparison to the present invention at least because it does not disclose techniques for calculating the cost of encoding frames of rendered video in a live streaming application, providing sufficiently low latency for live streaming for gaming applications, or providing techniques for using video data to maximize encoded video within bitrate constraints. The present invention is also superior because it collects and stores encoder settings for video data, which can be reused indefinitely.

U.S. Patent Publication No. US2016/0198166 A1, ("the '166 Publication"), discloses systems and methods for pseudo multi-pass encoding techniques that provide a solution for real-time encoding. The system disclosed is one in which the input video frames are down-sampled and encoded in a first pass to form a sub-group of pictures. Those sub-groups are then used to generate encoding statistics which are used to generate a set of second-pass coded frames. The techniques described by the '166 Publication are inferior to the present invention at least because the present invention teaches techniques for calculating a specific cost for encoding frames of rendered video in a live streaming application and for using such data to maximize encoded video within bitrate constraints without any down-sampling.

U.S. Pat. No. 9,697,280 ("the '280 Patent"), discloses systems and methods for producing a mobile media data record from the normalized information, analyzing the mobile media data record to determine a settlement arrangement, and providing at least some of the participants represented in the mobile media record with relevant information from the settlement agreement. The systems and methods are capable of performing multi-pass encoding where outputs of a previous encoder are daisy-chained to the inputs of a next encoder resulting in a delay before the encoded file is available for consumption. To reduce latency associated with sequential encoding, while achieving equivalently high quality, successive encoding stages may be configured in a pipeline such that the output of a first encoder is fed to the input of a second, so that encoding in each encoder is offset by a small amount of time, allowing most of the encoding to run in parallel. The total latency may then approximate the sum of the latencies of each encoder from the first block read in to the first block written out. The total latency may readily facilitate real-time multi-pass encoding. Similar to the other technologies described in this section, however, the '280 Patent does not disclose techniques for calculating the cost of encoding frames of rendered video in a live streaming application and for using such data to maximize encoded video within bitrate constraints, as are disclosed in the present invention.

U.S. Patent Pub. No. US 20170155910 A1 ("the '910 Publication"), discloses systems and methods for splitting the audio of media content into separate content files without introducing boundary artifacts. The '910 Publication discloses a system where the encoder segments the original content file into source streamlets and performs two-pass encoding of the multiple copies (e.g., streams) on each corresponding raw streamlet without waiting for a TV show to end, for example. As such, the web server is capable of streaming the streamlets over the Internet shortly after the streamlet generation system begins capture of the original content file. The delay between a live broadcast transmitted from the publisher and the availability of the content depends on the computing power of the hosts. However, the '910 Publication does not disclose techniques for calculating the cost of encoding frames of rendered video in a live streaming application, providing sufficiently low latency for live streaming for gaming applications, and for using video data to maximize encoded video within bitrate constraints, as are disclosed in the present invention.

U.S. Pat. No. 9,774,848 ("the '848 Patent"), discloses systems and methods for the enhancement to the video encoder component of the MPEG standard to improve both the efficiency and quality of the video presentation at the display device. The technology disclosed teaches performing video compression by performing adaptive bit allocation by means of look-ahead processing. In MPEG video compression, a given number of video frames (15, 30, 60 and so on) are grouped together to form a Group-of-Pictures (GoP). Pictures within a GoP are coded either as I, P or B pictures (frames). The number of bits allocated to each GoP is made proportional to the number of frames contained in it. The system performs real-time look-ahead to collect statistics that enable adaptive bit allocation. It also discloses methods for motion estimation in which modified 3D pipeline shader payloads are able to handle multiple patches in the case of domain shaders or multiple primitives when primitive object instance count is greater than one, in the case of geometry shaders, and multiple triangles, in case of pixel shaders. A motion estimation engine is used by graphics processor components to assist with video in decoding and processing functions that are sensitive or adaptive to the direction or magnitude of the motion within the video data. The '848 Patent, however, does not disclose techniques for calculating the cost of encoding frames of rendered video in a live streaming application, providing sufficiently low latency for live streaming for gaming applications, and for using video data to maximize encoded video within bitrate constraints, as are disclosed in the present invention. Further, the technology of the '848 Patent acts, at best, as an assist, and does not perform precoding in the spatial manner as disclosed in the present invention. As such, it is not able replicate advantageous multi-pass encoding in the same real-time manner as the present invention.

U.S. Pat. No. 9,749,642 ("the '642 Patent"), discloses systems and methods in which a video encoder determines an [motion vector] MV precision for a unit of video from among multiple MV precisions, which include one or more fractional-sample MV precisions and integer-sample MV precision. The video encoder can identify a set of MV values having a fractional-sample MV precision, then select the MV precision for the unit based at least in part on prevalence of MV values (within the set) having a fractional part of zero. Or, the video encoder can perform rate-distortion analysis, where the rate-distortion analysis is biased towards the integer-sample MV precision. Again, however, the '642 Patent does not disclose techniques for calculating the cost of encoding frames of rendered video in a live streaming application, providing sufficiently low latency for live streaming for gaming applications, and for using video data to maximize encoded video within bitrate constraints, as are disclosed in the present invention.

European Patent No. EP1820281B1 ("the '281 Patent"), discloses systems and methods for dual-pass encoding. The methods disclosed include the steps of: a) receiving the picture, (b) calculating a first degree of fullness of a coded picture buffer at a first time, (c) operating on the first degree of fullness to return a second degree of fullness of the coded picture buffer at a second time, (d) storing the picture for an amount of time, (e) during that amount of time, measuring a first degree of complexity of the picture, (f) operating on the first degree of complexity of the picture and the second degree of fullness to return a preferred target size for the picture, and (g) subsequently to step d, providing the picture and the preferred target size to the multi-processor video encoder, where the first time corresponds to the most recent time an accurate degree of fullness of the coded picture buffer can be calculated and the second time occurs after the first time. Again, however, the '281 Patent does not disclose techniques for calculating the cost of encoding frames of rendered video in a live streaming application, providing sufficiently low latency for live streaming of gaming applications, and for using video data to maximize encoded video within bitrate constraints, as are disclosed in the present invention.

Japanese Patent No. JP06121518B2 ("'518 Patent"), discloses systems and methods for encoding a selected spatial portion of an original video stream as a stand-alone video stream, where the method comprises obtaining picture element information pertaining to the selected spatial portion; obtaining encoding hints derived from a complementary spatial portion of said original video stream that is peripheral to the selected spatial portion; and encoding the selected spatial portion with use of the encoding hints. Once again, however, the '518 Patent does not disclose techniques for calculating the cost of encoding frames of rendered video in a live streaming application, providing sufficiently low latency for live streaming for gaming applications, and for using such data to maximize encoded video within bitrate constraints, as are disclosed in the present invention.

U.S. Patent Publication No. 2006/0230428 ("the '428 Publication") discloses systems and methods directed to a networked videogame system that allows multiple players to participate simultaneously. The '428 Publication discloses a server that has the ability to store pre-encoded blocks that are compressible and correspond to subsections of a video frame for a game. The system is also able to generate game content using pre-encoded blocks in response to user actions in the game. That content can then be transmitted to the user. Again, this technology does not perform precoding in the spatial manner as disclosed in the present invention, and it is not able replicate advantageous multi-pass encoding in real-time. Furthermore, unlike the technology of the '428 Publication, the present invention allows for the system to change parameters over all portions of the frames in a temporal sequence (such as resolution) during runtime and provides sufficiently low latency for live streaming for gaming applications.

U.S. Pat. No. 8,154,553 ("the '553 Patent") discloses systems and methods that are directed to a streaming game server with an interception mechanism for rendering commands, and a feed-forward control mechanism based on the processing of the commands of a rendering engine, on a pre-filtering module, and on a visual encoder. The '553 Patent technology uses a graphics API to extract a set of object-level data, referring to the visual complexity and to the motion of the objects in the scene. That information is used to control the rendering detail at the GPU level, the filtering level at the video pre-processor, and the quantization level at the video encoder. The system also computes a motion compensation estimate for each macroblock in the target encoded frame in a video encoder. Similar to the other technologies discussed herein, the system disclosed in the '553 Patent does not perform precoding in the temporal or spatial manner disclosed in the present invention, and it is not able to replicate advantageous multi-pass encoding in real-time because it, in fact, drops frames in response to bitrate peaks. Furthermore, unlike the technology of the '428 Publication, the present invention allows for the system to provides sufficiently low latency for applications live game streaming.

As is apparent from the above discussion of the state of the art in this technology, there is a need in the art for an improvement to the present computer technology related to the encoding of real-time game environments.

SUMMARY OF THE INVENTION

It is therefore an object of the present invention to disclose systems and methods for maintaining a constant bitrate by hinting an encoder. In an exemplary embodiment, a server monitors for information related to changes in frame encoding, calculates tolerance boundaries, rolling average frame time, and short-term trends in frame time, and uses those calculations to identify a frame time peak. The server then hints an encoder to modulate the quality settings of frame output in proportion to the size of the frame time peak.

It is another object of the present invention to disclose systems and methods for maintaining a constant bitrate by hinting an encoder, in which the calculations of tolerance boundaries, rolling average frame time, and short-term trends in frame time are used to identify high-entropy frames.

It is yet another object of the present invention to disclose systems and methods for maintaining a constant bitrate by hinting an encoder, in which the server calculates a quality scaling value for a frame time outside of the tolerance boundaries, and uses that calculation to identify a frame time peak.

It is yet another an object of the invention to disclose systems and methods for encoding in which a renderer records one or more playthroughs in a game environment, sorts a plurality of frames from the one or more playthroughs into a plurality of cells on a heatmap, and collects the list of sorted frames. An encoder may then encode one or more frames from the list of sorted frames to calculate an average encoded frame size for each cell in the heatmap, and associate each average encoded frame size with a per-cell normalized encoder quality setting. The encoder then calculates an average frame size for the heatmap from the average encoded frame size of each cell and uses them during gameplay as hints for coding a video sequence.

It is another object of the invention to disclose systems and methods for encoding in which a renderer records a video sequence comprised of a plurality of frames, and an encoder codes the video sequence in a multi-pass mode that optimizes encoder quality settings against the first frame of the video sequence. The encoder may then record the encoder quality setting. The renderer may then normalize the encoder quality settings to the first frame of the video sequence and use them to hint the encoder to code the video sequence during playback.

It is another object of the invention to disclose systems and methods for encoding in which one or more frames are encoded in a single pass.

It is yet another object of the invention to disclose systems and methods for encoding in which the data extracted from one or more playthroughs includes a plurality of frames and a player location associated with each of the frames.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
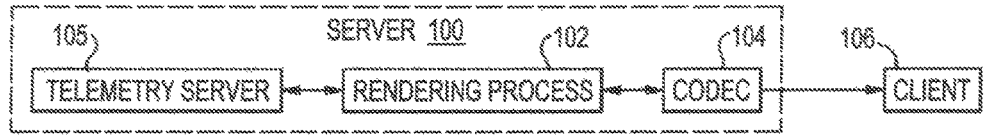
FIG. 1 is diagram of an exemplary environment in which real-time rendered video is livestreamed to a remote viewer.

In describing the preferred embodiments of the invention illustrated in the drawings, specific terminology will be resorted to for the sake of clarity. However, the invention is not intended to be limited to the specific terms so selected, and it is to be understood that each specific term includes all technical equivalents that operate in a similar manner to accomplish a similar purpose. Several preferred embodiments of the invention are described for illustrative purposes, it being understood that the invention may be embodied in other forms not specifically shown in the drawings.

During typical operation of a live-streaming video game running at 60 frames per second, the encoder calculates motion vectors and residuals. When a video frame is significantly different from the previous frame due to new video information, the residuals calculated by the encoder may be larger than normal, causing a spike in network bandwidth usage. An encoder will adapt its encoding settings during live streaming in response to factors such as these bitrate spikes, but can only adjust settings reactively.

In cases where video frames are rendered in real-time, the encoder can be forewarned to preemptively adapt the encoding settings to maintain the highest possible quality for a bitrate constraint. The process of providing settings to override encoder-selected settings is called hinting. Since the renderer has information about frames before they are encoded, the renderer is occasionally more suited to select appropriate encoder settings and should hint the encoder accordingly. The renderer can hint the encoder when an incoming frame is a high entropy image, when an incoming frame has no relation to previous frames, or for other reasons that may result in large residuals, quality drops, or bitrate spikes.

FIG. 1 is a diagram of an exemplary environment in which real-time rendered video is livestreamed to a remote viewer. The server 100 may be comprised of any hardware capable of simultaneously running a real-time rendering process 102 (also referred to as a "renderer" herein) and a streaming codec 104 (also referred to, herein, as an "encoder"). The server 100 may be comprised of one or more hardware devices, including one or more telemetry servers 105 that perform telemetry measurements, as explained below. The server 100 and the telemetry server 105 may be local or remote to the rendering process 102 and the codec 104. The codec 104 must also have the ability to communicate its encoder quality settings back to the rendering process 102 through direct reporting or some other monitoring process known in the art. The encoded video stream is transmitted over a network to a client 106 device. The client 106 may be comprised any hardware capable of decoding and displaying the video stream.

Figure 2:
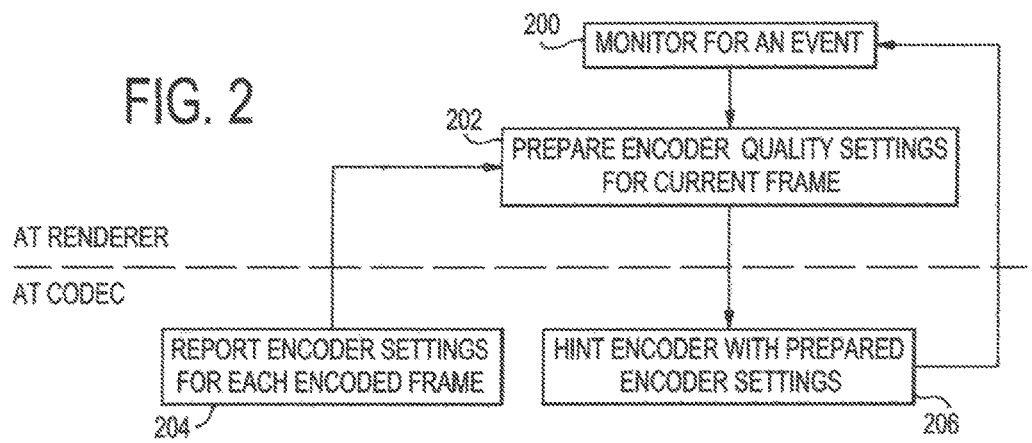
FIG. 2 is a flow diagram outlining the stages of load estimation based encoder hinting.

FIG. 2 is a flow diagram outlining the stages of load estimation based encoder hinting. While the renderer is generating video, the rendering process or some other server-side process should be monitoring for information that would change how a frame needs to be encoded at "MONITOR FOR AN EVENT," step 200. This may include information such as the number of draw calls made to the renderer during this frame, an attempt to calculate the size of the encoded residuals based on the number of pixels which appear for the first time in a frame, or some other information that attempts to correlate rendering performance to encoder performance. The monitored information may include any message, calculated result, outcome, or other discretely measurable value that occurs during the runtime rendering process. When information is read that would indicate the encoded frame size will be significantly different from the previous frame's encoded frame size, this information is called an event.

Figure 3:
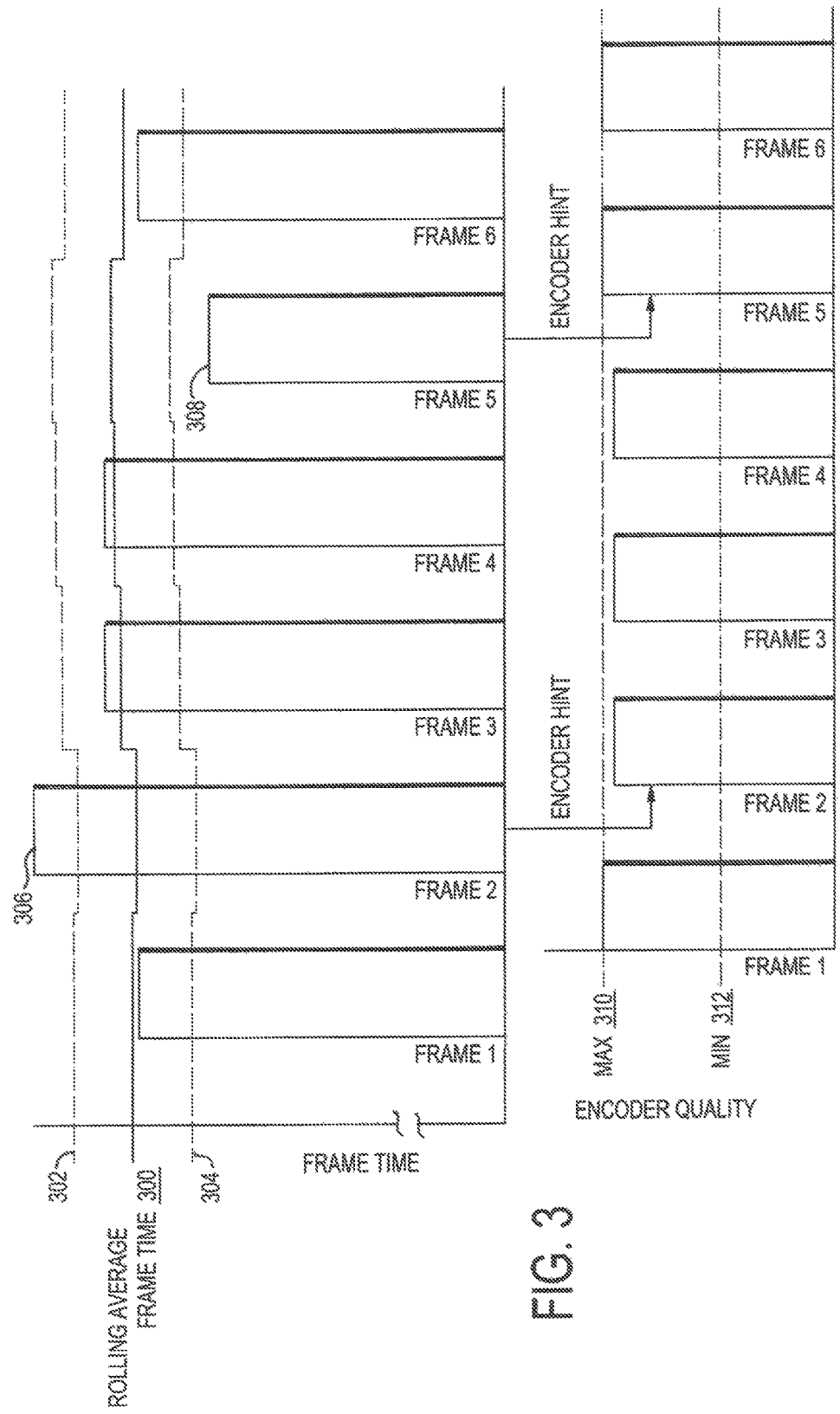
FIG. 3 is a diagram of an exemplary implementation that detects frame time peaks and frame time valleys and then alters the encoder settings accordingly.

The event may originate in the renderer, as described by FIG. 3, where an exemplary implementation of peak detection monitoring in the rendering process monitors each frame's rendering time to detect unusually long or unusually short frame times. In this case, an unusual frame rendering time is considered an event.

When the renderer receives an event, there may be some additional calculations required at the renderer to generate encoder quality settings for the purpose of hinting the encoder at "PREPARE ENCODER QUALITY SETTINGS FOR CURRENT FRAME," step 202. These calculations may include modifying information measured during the event monitoring of the previous step. These calculations may also include modifying the runtime encoder quality settings which are reported by the encoder to the renderer on each frame and should be available as-needed at "REPORT ENCODER SETTINGS FOR EACH ENCODED FRAME," step 204. The generated encoder quality settings are sent from the renderer to the encoder at "HINT ENCODER WITH PREPARED encoder SETTINGS" 206. The renderer will continue to monitor for events on future frames.

In the example of FIG. 3, when a frame takes an unusually long time to render, the renderer will hint the encoder to reduce the quality settings in proportion to the size of this frame time peak. To prepare the encoder quality setting value, the renderer may use the measured frame time from the current frame, the measured frame times from some number of previous frames, and the runtime encoder quality settings as reported by the encoder. These calculations are explained in more detail in connection with the discussion of FIG. 3.

Other processes running on the server may also have access to frame information that can be used to hint the encoder settings. For example, a game engine that contains a renderer may use the measured impact on encoded video bandwidth by visual effects triggered by the game to reduce the encoder quality settings. To gather information on the additional encoding cost of a given visual effect, a developer may need to apply an effect and measure the increase in bitrate when encoding at various encoder quality settings. The measurements can be used to select a quality for which the encoded frame size for a frame containing the visual effect is roughly of the same encoded frame size as a previous frame which did not contain the visual effect. The difference between the quality setting selected for the visual effect and the default quality setting is referred to as the settings delta. The encoder may be hinted to use the selected quality or hinted to reduce the current quality by the measured settings delta. The results should be stored in a format that can easily translate a visual effect event into the associated encoder hint such as a lookup table or other type of indexed array.

FIG. 3 is an exemplary implementation that detects frame time peaks and frame time valleys, and then alters the encoder settings accordingly. This example uses the correlation between rendering time and image entropy to estimate the effect on the video stream's bitrate. If a frame contains lots of new visual information, that is additional elements which contribute to the frame for the first time, it is likely to take more time to render the frame when compared to the previous frames. For example, if a frame is rendered with roughly the same frame time as the previous frame, it is likely that the environment has not changed significantly. This implied correlation is particularly apparent in a first-person game/engine. If the rendered frame time is suddenly higher, it implies that something in the environment is newly introduced. The encoder will also struggle with any new video information, like sudden explosion effects covering the screen or sudden new geometry on screen. Similarly, lots of new information in a frame will increase the size of the residuals calculated by the encoder. Therefore, monitoring for peaks in rendering time may identify frames that are likely to contain high-entropy images before they can cause a spike in the video stream's bitrate.

A rolling average is used in signal processing and statistical analysis to identify short-term outliers while accounting for long-term trends. A rolling average is calculated by finding the arithmetic mean of a certain number of previous data points; the set of previous data points used to calculate the rolling average is called the rolling window. In the case of live-rendering, identifying frame times which deviate from the rolling average frame time can identify high-entropy frames. The rolling average frame time 300 in this example is the average frame time for the previous rolling window. That is, the frame times are summed for each frame in the rolling window then the sum is divided by the number of frames in the rolling window. The rolling window size may be tuned based on the typical frequency of long-term frame-time trends as measured during runtime profiling to examine typical data trends. For an example rolling window size of ten frames, the average frame time will be calculated based on the previous ten frame times. As a side-effect of any low-pass filter, if the rolling window is too small, there may be more false-positives than necessary in the peak detection. It may classify a frame as "exceptionally busy" when, in reality, the longer frame time is explained by some long-term pattern of behavior that frequently occurs in the renderer. The rolling average frame time 300 is accompanied by an upper tolerance 302 and lower tolerance 304. The tolerance may be tuned to identify typical short-term trends in the frame time. For a real-time renderer running at 60 frames per second, a tolerance of ±1 ms, or about 6.25%, may be sufficient. Frame times can vary within the tolerance of the rolling average frame time without triggering any encoder hinting. Finding the appropriate window size and tolerance values may require some runtime profiling to determine typical trends in frame time. For example, a game running at 100 frames per second might only update shadows every other frame leading to typical jitter of 1 ms, requiring a tolerance greater than 10%. Conversely, a game might run comfortably at 30 frames per second at a very stable frame time of 33 ms with the most demanding visual effect contributing only 0.5 ms, so the tolerance may be as low as 1.5%.

The frame time for the current frame is compared to the rolling average frame time. If the current frame time is outside of the tolerance boundaries, the quality is adjusted on the encoder. Tolerance boundaries may be calculated by measuring the frame times, using a process called profiling, to examine the typical changes in frame time between adjacent or nearly-adjacent frames (short-term trends) and the changes in frame time over certain windows (such as periodically repeating patterns or other long-term trends). The rolling window size and tolerance can then be adjusted until the encoder hinting is only triggered during high-entropy/busy moments, but not during moments where the player is moving around and exploring the environment. If the frame time exceeds the upper tolerance 302, as in the example case of "FRAME 2" 306, the encoding quality will be reduced. If the frame time is under the lower tolerance 304, as in the example case of "FRAME 5" 308, the encoder quality will be increased. In certain embodiments, the encoding quality may be increased back up to full capacity any time the frame time falls below the tolerance. Depending on the implementation, a system may also choose to scale the quality back up more slowly using a scaling method similar to that used for lowering quality.

An exemplary hinting method may scale the quality between an upper-bound 310 and lower-bound 312 quality setting. For example, the upper-bound may be the default quality settings and the lower-bound may be some percentage, such as 50%, of the default quality. If a frame time peak falls above the tolerance, the quality settings may be linearly scaled between the upper-bound and lower-bound based on the size of the frame time peak above the tolerance. If a frame time falls below the tolerance, the quality settings may be returned to the upper-bound value.

To calculate the quality scaling value for a frame time outside of the tolerance, the frame time should first be normalized with respect to the rolling average frame time exemplarily in accordance with the below equation (1).

$$\text{normalized time} = \frac{\text{frame time}}{\text{rolling average frame time}} \quad (1)$$

Subtracting 1 from the normalized time results in the frame's deviation from the rolling average frame time. Dividing the deviation by the tolerance and then subtracting 1 provides a scaling value. This scaling value should be clamped to remain between 0 and 1; all negative scaling values should be clamped to 0 and all values above 1 should be clamped to 1, exemplarily in accordance with the below equation (2).

$$\text{scaling value} = \frac{\text{normalized time} - 1}{\text{tolerance}} - 1 \quad (2)$$

The clamped scaling value can be used to interpolate between the upper-bound quality setting and the lower-bound quality setting. A clamped scaling value of 0 represents the upper-bound quality and a clamped scaling value of 1 represents the lower-bound quality, exemplarily in accordance with the below equation (3).

$$\text{scaled quality setting} = \max - (\text{scaling value} * (\max - \min)) \quad (3)$$

In the example, if "FRAME 2" 306 takes 16 ms when the rolling average is 15 ms, the resulting clamped scaling value is 0.025 or 2.5%. If the upper-bound quality value is the default quality settings and the lower-bound is 50% of the default quality, the scaled quality setting for this frame will be 98.75% of the default quality.

If "FRAME 5" 308 takes 14.25 ms when the rolling average is 15.25 ms, the frame time is below the tolerance and the scaling value will be clamped to 0. The scaled quality setting will be set to the upper-bound quality settings.

Figure 4:
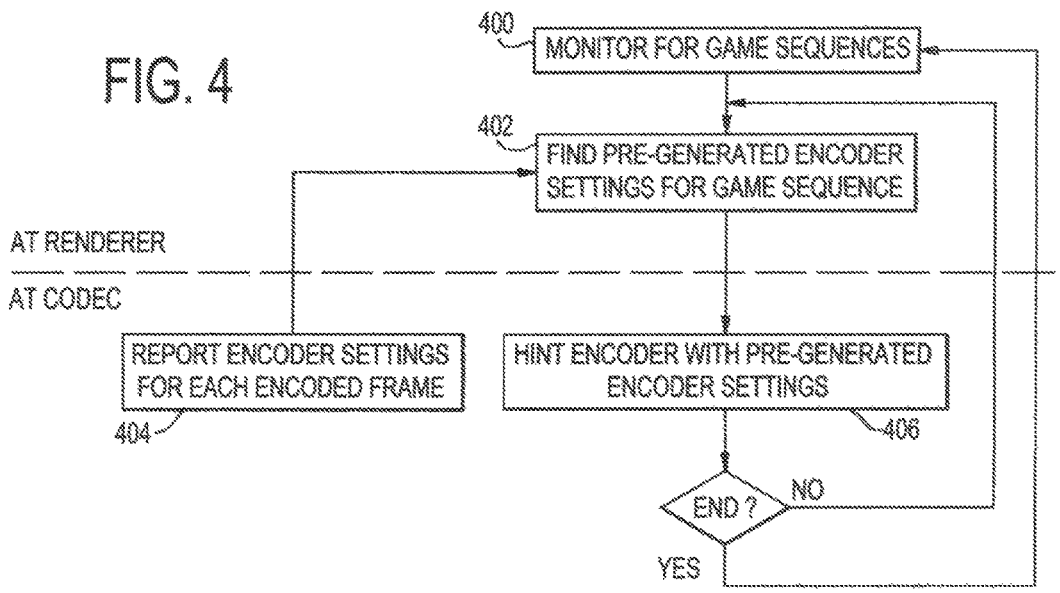
FIG. 4 is an exemplary flow diagram outlining the use of pre-generated encoder quality settings during the runtime of a live-renderer.

Multiple encoder hinting methods may be layered by combining the prepared encoder quality settings values from the preparation step, as shown at step 400 in FIG. 4, before sending the aggregated encoder quality settings value to the encoder for hinting, as shown at step 406 in FIG. 4. In one embodiment, the arithmetic mean of the prepared encoder quality settings may be found in order to generate a single value that equally incorporates the contributions from all sources. In another embodiment, a weighted arithmetic mean may be calculated by assigning a weight to each source that may contribute an encoder quality settings value for encoder hinting. The assigned weights may be used to more-strongly weigh one contributing source over another. For example, contributions from a frame-time peak event may have a stronger correlation on changes in encoded bitrate when compared to contributions from a single visual effect event so it may be desirable to more-highly weigh the contributions from the frame-time peak event. The weighted arithmetic mean can be calculated by using the standard definition, exemplarily in accordance with the below equation (4), where i=1 represents the first number in the set of n quality settings. Note that the indices on mathematical sets start at 1, different from programming indices which start at 0.

$$\bar{x} = \frac{\sum_{i=1}^{n} w_i x_i}{\sum_{i=1}^{n} w_i} \quad (4)$$

FIG. 4 is an exemplary flow diagram outlining the use of pre-generated encoder quality settings during the runtime of a live-renderer. The renderer should monitor for the sequences which have a set of pre-generated encoder quality settings at "MONITOR FOR GAME SEQUENCES," step 400. These sequences may include temporally predictable sequences of frames, such as in-engine real-time cutscenes, or spatially predictable sequences which can be converted to time series during runtime when the player location is known. Temporally predictable sequences are sequences of frames in which every frame has some known relationship with its adjacent neighbor. That is, a sequence of frames is temporally predictable if it is of a consistent length, consistent order, and any two adjacent frames have a consistent relationship in pixel-data and motion-data. Spatially predictable sequences provide some relationship between two adjacent virtual locations which can be used to make inferences about a temporal sequence, which is constructed when the virtual space is traversed during the runtime of the renderer. That is, two locations in a virtual space are spatially related if they produce a temporally predictable sequence when a virtual camera moves between the two virtual locations. For example, in a video game, two adjacent locations are temporally related if moving between the two locations produces video in which the pixel-data and motion-data are somewhat consistent. This is typically true of most 3D levels in video games, since the environment and background surrounding the player are typically rendered in fixed locations as the player traverses the level.

The pre-generation of encoder quality settings is described in more detail in connection with FIG. 5. The pre-generated encoder quality settings are stored to disk on the server in a runtime-readable format such as a lookup table or heatmap. When the beginning of a sequence is detected, the pre-generated encoder quality settings for the detected game sequence are read and prepared at "FIND PRE-GENERATED ENCODER SETTINGS FOR GAME SEQUENCE," step 602. Encoder quality settings may need to be prepared if they have been normalized before storage. Preparation may include multiplying normalized encoder quality settings by the runtime encoder quality setting, a target encoder quality setting, or an encoder quality setting from some other source. In certain embodiments, detection of an event may be for each of the sequences encoder quality settings that are pre-generated. In other embodiments, a check may be performed at runtime when each cutscene starts to determine whether it is in the list of sequences for which settings exist. If the pre-generated encoder quality settings were normalized before storage, there will be a multiplication step to prepare the encoder quality settings. In the example described in connection with FIG. 6, encoder quality settings are generated for the frames in an in-engine real-time cutscene and normalized to the first frame of the sequence. For a normalized time series such as this, the encoder quality settings will need to be prepared by multiplying the normalized values by the runtime encoder quality setting for the first frame in the sequence. The encoder quality settings are reported by the encoder on each frame and should be available as-needed at "REPORT ENCODER SETTINGS FOR EACH ENCODED FRAME," step 604. In the example described in connection with FIG. 7, encoder quality settings are generated for each location in a map and are normalized to the average encoder quality setting over the whole map. For a normalized spatial series such as this, the encoder quality settings will need to be prepared by multiplying the normalized values by the runtime encoder quality setting for the first frame in the sequence.

The encoder quality settings will be sent to the encoder for each frame in the sequence at "HINT ENCODER WITH PRE-GENERATED ENCODER SETTINGS," step 606. The encoder will use the encoder quality settings sent from the renderer to encode the next frame. The renderer will continue to prepare the pre-generated encoder quality settings and hint the encoder on each frame until the sequence is complete. When the sequence ends, the renderer will continue to monitor for the next sequence. For the in-engine real-time cutscene example described in connection with FIG. 6, the encoder will be hinted for each frame in the cutscene until the cutscene ends. For the exemplary heatmap method described in connection with FIG. 5, the encoder will be hinted for the entire duration that the player is within the bounds of the area defined by the heatmap.

Figure 5:
FIG. 5 is an exemplary flow diagram outlining the stages of pre-generating encoder quality settings for a live-rendered sequence in accordance with an embodiment of the invention.

FIG. 5 is a flow diagram outlining the stages of pre-generating encoder quality settings for a live-rendered sequence. Encoder quality settings can be pre-generated for any sequence that has a predictable and measurable temporal or spatial component. A sequence may have unpredictable portions, such as an in-engine real-time cutscene that will render the armor currently being worn by the player character or an in-world cutscene that allows the players to move or look around while the events play out. A sequence should be identified that has predictable portions by looking for adjacent-frame relationships in time-series sequences such as in-engine real-time cutscenes or adjacent-location relationships in virtual spaces which will be used during runtime to generate frame sequences such as traversable areas in video game levels. One such sequence should be identified at "SELECT SEQUENCE," step 500.

At the encoder, the encoder quality settings should be generated for the sequence with the goal of maintaining a constant bitrate at "GENERATE ENCODER SETTINGS FOR SEQUENCE," step 502. Encoder quality settings for an in-engine real-time cutscene may be calculated by recording a video of the cutscene and encoding the video with a multi-pass encoding mode. Multi-pass encoding will encode the first frame and use the size of the encoded first frame to constrain all subsequent frames. As each frame is encoded, the encoded size is compared to the encoded size of the first frame and the quality settings are adjusted for the current frame until the encoded frame sizes are close in size. In certain embodiments, the sequence of frames may be encoded with a fixed number of passes in a multi-pass encoding mode. In other embodiments, the sequence may be fed through successive passes in a multi-pass encoding mode until the per-frame sizes settle at a value and do not change between the final encoding pass and penultimate encoding pass. The encoder quality settings can be recorded as they are generated or extracted from the resulting encoded video. The generated encoder quality settings will be used during runtime to balance the bandwidth during the given sequence, thereby avoiding bitrate peaks and dips. In contrast to pre-encoding the video of a pre-rendered cutscene and storing it for playback, generating encoder quality settings in this way will allow in-engine real-time cutscenes to include context-based content such as customizable player armor, weapons, or other cosmetic items while still benefiting from the bandwidth equalization provided by pre-generated quality settings.

A similar process can be repeated many times to generate encoder settings for a spatially-related sequence. The process is described in more detail by the example data flow described in connection with FIG. 7.

Figure 8:
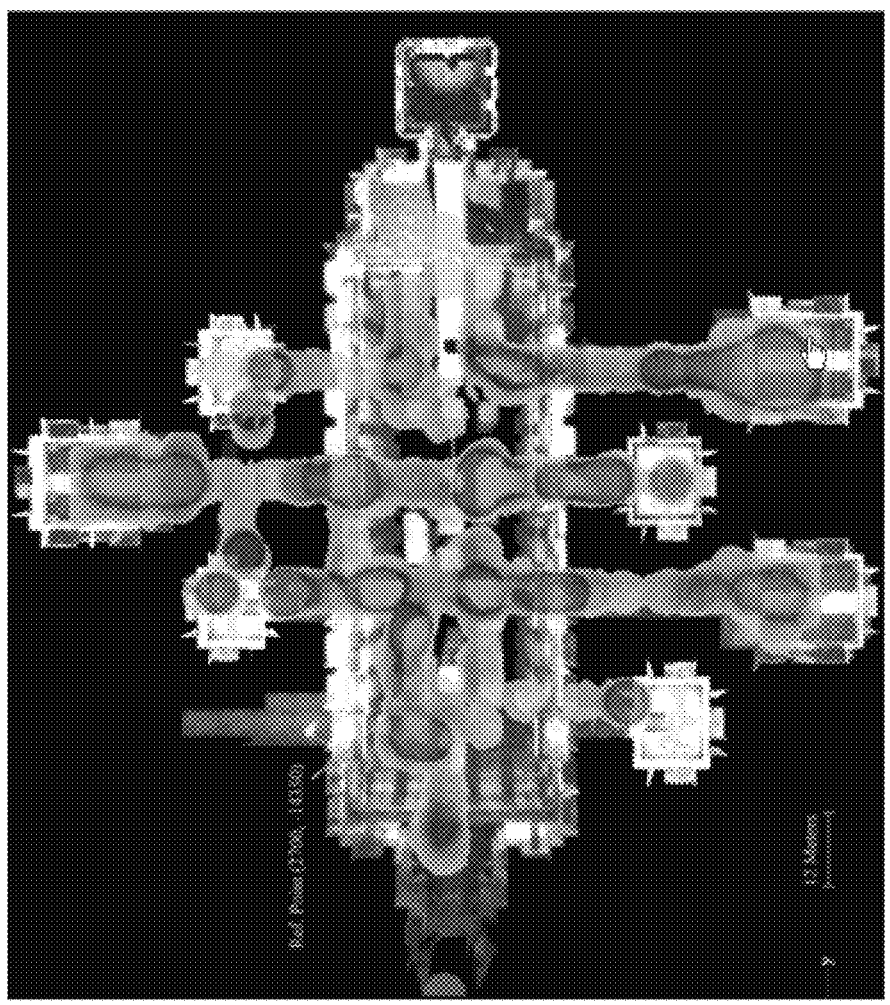
FIG. 8 is an exemplary heatmap from which normalized encoder quality settings may be extracted in accordance with an embodiment of the invention.

For in-engine real-time cutscenes, the encoder quality settings for each frame should be normalized by dividing them by the encoder quality setting value of the first frame in the sequence. This allows dynamic elements of the sequence, such as player armor or cosmetic items, to be represented in the final encoder quality settings prepared at runtime. For spatially-related sequences which will be stored as a heatmap, each encoder quality setting should be normalized to the average encoder quality setting over the whole area defined by the heatmap by dividing each encoder quality setting by the map-wide average encoder quality setting. An exemplary heatmap is shown in FIG. 8. The normalized encoder values, generated at the rendering process, should be organized into the appropriate runtime-readable format, such as a list of encoder quality settings for each frame in a time series or a heatmap that defines an encoder quality setting for each location in a map, and stored at "NORMALIZE AND STORE ENCODER QUALITY SETTINGS FOR EACH FRAME IN THE SEQUENCE," step 504.

Figure 6:
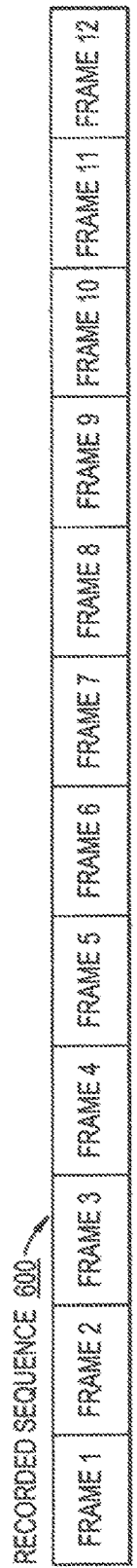
FIG. 6 is a diagram of the data generated during an exemplary pre-generation of encoder quality settings for an in-engine real-time cutscene of determinate length in accordance with an embodiment of the invention.

FIG. 6 shows how the data is generated during an exemplary pre-generation of encoder quality settings for an in-engine real-time cutscene of determinate length. In-engine real-time cutscenes, unlike pre-rendered cutscenes, are generated during runtime using the same rendering engine that is used to produce the rest of the live-rendered video output. An in-engine real-time cutscene may also include contextual information about the game state, such as cosmetic items worn by the player, non-player characters in the player's group, or other game state controlled by player choice. Although in-engine real-time cutscenes have been historically lower-quality than pre-rendered cutscenes, they are becoming more common as live-rendered visual fidelity becomes closer to pre-rendered visual fidelity. In-engine real-time cutscenes are also commonly used where several options, such as language options, resolution options, and character customization options, might impact the video output of a cutscene so that a game disk does not have to include multiple versions of a pre-rendered cutscene.

In this example, an in-engine real-time cutscene of 480 frames in length, roughly 8 seconds long for a game running at 60 frames per second, is selected. This cutscene will play back the same series of events for all players. The cutscene video is recorded at the renderer, producing a series of 480 frames in the recorded sequence 600. The recorded sequence 600 is encoded using a multi-pass encoding mode. While encoding each frame in the recorded sequence, the multi-pass encoding process will alter the encoder quality settings so that the encoded frame size becomes closer to the encoded size of the first frame. The first frame in the sequence is used as a frame-size reference in order to ensure a consistent bitrate throughout the entire encoded sequence.

The multi-pass encoder quality settings 602 are either recorded during the encoding process at the encoder or extracted from the encoded results produced by the encoder. The encoder quality settings are an ordered list of floats. At 4 bytes per float, the entire ordered list of 480 floats consumes only 1,920 bytes of data. The small file size allows a live-renderer to store many sets of pre-generated encoder settings in memory during runtime and may result in the favorable result of performing the process described herein for every game sequence without running into memory constraints.

At the renderer, the encoder quality settings are normalized to the first frame exemplarily in accordance with the below equation (5).

$$\text{normalized } QP = \frac{\text{frame } QP}{\text{first frame } QP} \quad (5)$$

The normalized encoder quality settings 604 are stored as an ordered list of floats, preferably at the encoder.

The ordered list of normalized quality settings 604 is read when the cutscene begins to play during runtime. The normalized quality settings are multiplied by the runtime encoder quality setting for the first frame in the sequence, as reported by the encoder to the rendering engine, and then used to hint the encoder for each subsequent frame in the cutscene. In certain embodiments, the H.264 standard-compliant library ffmpeg running in Constant Rate Factor (CRF) mode will accept an override quantization parameter value on the command line using the –crf switch.

Normalizing the encoder quality settings allows the pre-generated encoder quality settings to be used during runtime playback of the cutscene in multiple different contexts. For example, multiplying the normalized encoder settings 604 by the runtime encoder quality setting reported by the encoder for the first frame in the sequence produces a consistent bitrate for the entire cutscene regardless of any customizable player armor that the player chooses to wear. Similarly, the method accounts for the different rendering settings, such as screen resolution, in which an in-engine real-time cutscene may be played.

Figure 7:
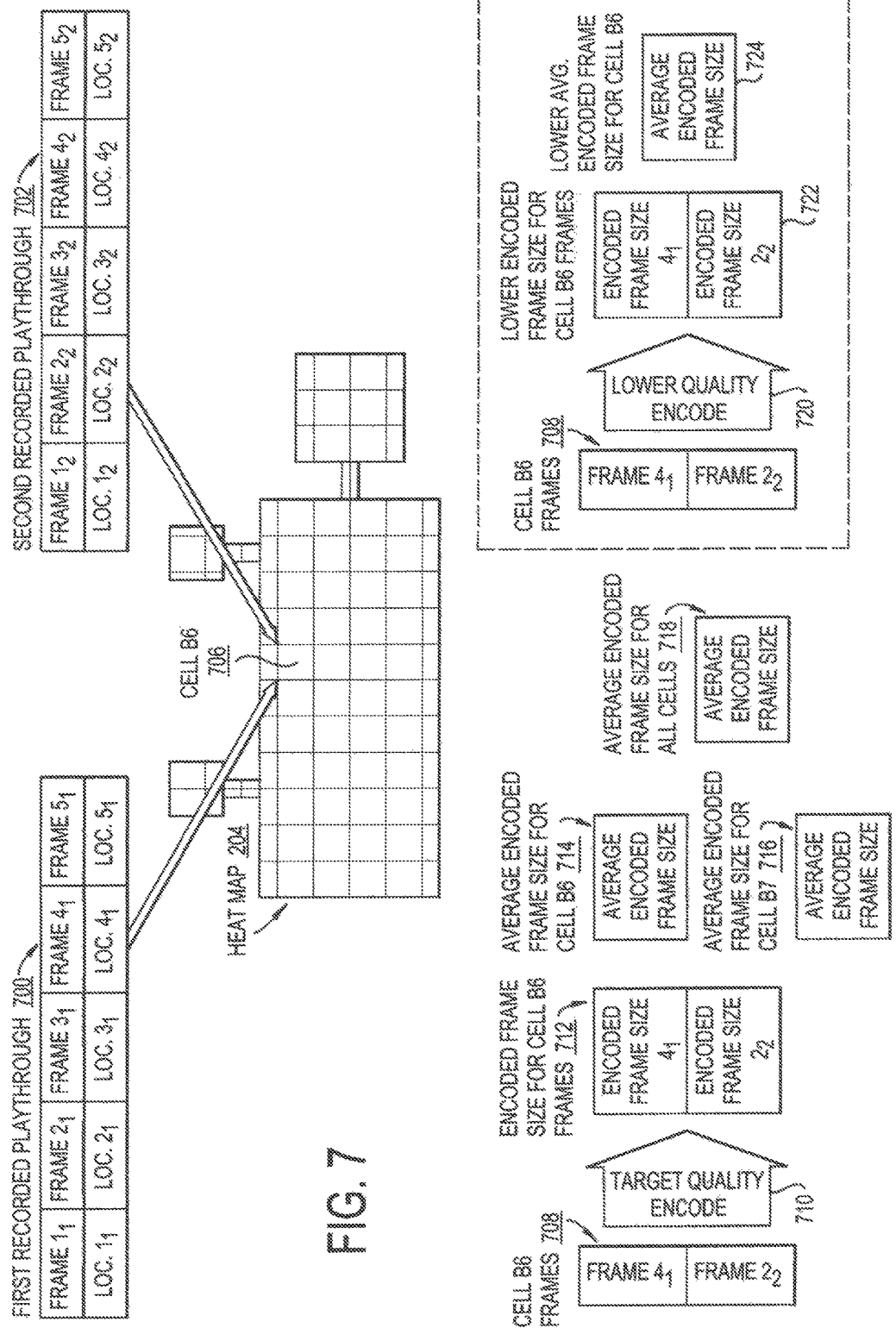
FIG. 7 is a diagram of an exemplary pre-generation of encoder quality settings for a spatially related sequence in accordance with an embodiment of the invention.

FIG. 7 is a diagram of the exemplary pre-generation of encoder quality settings for a spatially related sequence such as the sequence generated at runtime when a player traverses a virtual space in a video game. Player position in a video game can be generally correlated to the image entropy of output video since a player's view has a disproportionately large effect on the encoded video stream's bitrate. This correlation is most apparent when comparing the encoded video bitrate between video captured in open areas and video captured in tight areas. Open areas, such as outdoor areas, produce video at a higher average bitrate while tight areas, such as corridors, produce video at a lower average bitrate. This relationship occurs because outdoor areas tend to be non-uniform, vast areas with lots of competing motion such as ambient animation on vegetation while indoor areas tend to consist of static architectural geometry which produce cohesive motion vectors and smaller residuals.

A map can be segmented by a grid and an encoder quality setting can be pre-generated for each cell in the map to form a heatmap, as shown in FIG. 5, of normalized encoder quality settings. A typical encoded video bitrate for a given player location can either be recorded using multiple real playthroughs or through procedurally-generated playthroughs. Since real players are unpredictable, it is often impossible to procedurally generate playthroughs that accurately capture the ways in which players will traverse a virtual space. Procedural playthroughs can be generated for any expected traversal-paths to quickly generate coverage of the entire map but may miss any unexpected traversal-paths which may be discovered by real players. Each approach will have drawbacks: tracking real telemetry takes significantly more time, but procedurally generated data might not accurately reflect real play experiences. In certain embodiments, a combination of both recordings may be used to provide a more accurate heatmap.

The recorded video should contain not only video frames, as shown in the recorded sequence 600 of FIG. 6, but will also establish a player location for each frame. The player location may be in 3D space or may be simplified to the horizontal 2D plane as represented by a top-down map. Portions of two example recorded playthroughs, the first recorded playthrough, shown as "FIRST RECORDED PLAYTHROUGH," at step 700 and the second recorded playthrough, "SECOND RECORDED PLAYTHROUGH," shown as step 702, are shown in the exemplary method described in connection with FIG. 7. The video frames are captured along with player locations. Each video frame in a captured playthrough video is sorted by location into the appropriate cell. In this example, frame 4 from the first recorded playthrough is shown at "First Recorded Playthrough," in step 700, and frame 2 from the second recorded playthrough is shown at "Second Recorded Playthrough," in step 702. At "Heatmap," step 704, both are sorted into cell B6 at "Cell B6," at step 706. As this example cell is quite large, the exemplary heatmap shown in FIG. 8 shows a heatmap with much smaller cells for greater resolution.

Both procedurally-generated and real playthroughs may be generated and recoded at the renderer. The resulting playthrough recordings may be collected in a centralized renderer location. As multiple playthroughs are collected, each cell in the heatmap may have multiple frames that were recorded at a location within the cell. A telemetry server 105 may be used during development to collect this data. The rendering/game engine may then generate the telemetry and send it to a centralized location. The telemetry server 105 could be local or remote to the renderer. Generated telemetry may also be manually collected by manually collecting produced telemetry files from the local rendering machine and sent to a centralized storage. The example of FIG. 7 shows the beginning of the list of frames belonging to cell B6 at "Cell B6 Frames," step 708. This list of spatially-related frames will grow as more playthrough recordings are collected or generated.

The collection of frames belonging to a cell may be encoded using a single-pass encoding mode used during livestreaming with a target encoder quality setting, shown at "Target Quality Encode," step 710. An encoded frame size will be generated for each frame belonging to the cell. The example of FIG. 7 shows the beginning of the list of encoded frame sizes belonging to cell B6, shown at "Encoded Frame Size for Cell B6 Frames," step 712. These encoded frame sizes may be averaged to find an average encoded frame size for the cell. The example of FIG. 7 shows the average encoded frame size belonging to cell B6 at "Average Encoded Frame Size for Cell B6," shown at step 714. The process should be repeated for all cells in the heatmap to find an average encoded frame size for each cell. The average encoded frame sizes are shown for cells B6 at "Average Encoded Frame Size for Cell B6," shown at step 714 and B7 at "Average Encoded Frame Size for Cell B7," shown at step 716 as a representation of the list of average frame sizes for all cells in the heatmap.

All average frame sizes for each cell should be averaged to find a map-wide average frame size at "Average Encoded Frame Size for All Cells," shown at step 718. This map-wide average frame size may be used as the target bandwidth. The cells with average encoded frame sizes larger than the map-wide average will be re-encoded at a lower encoder quality setting until the average cell frame size is nearly the same as the map-wide average. Similarly, the cells with an average encoded frame size smaller than the map-wide average will be re-encoded at a higher encoder quality setting until the average cell frame size is nearly the same as the map-wide average. In certain embodiments, the sequence of frames for a given cell may be encoded with a fixed number of passes in a multi-pass encoding mode. In other embodiments, the sequence may be fed through successive passes in a multi-pass encoding mode until the per-frame sizes settle at a value and do not change between the final encoding pass and penultimate encoding pass. In the example of FIG. 7, the average encoded frame size for cell B6 at step 714 is higher than the average encoded frame size for all cells at "Average Encoded Frame Size for All Cells," shown at step 718. The spatially-related frames belonging to cell B6 at "Cell B6 Frames," step 708 are re-encoded within the context of their original playthrough sequence at the encoder using a multi-pass encoding mode and a target frame size at "Lower Quality Encode," step 720 until the average encoded frame size for cell B6 at "Lower Average Encoded Frame Size for Cell B6," step 724 is nearly the same size as the average encoded frame size for all cells shown at "Average Encoded Frame Size for All Cells," step 718. All average frame sizes for cells should be nearly the same size when the process is completed for all cells.

Each cell should have an associated encoder quality setting which was used to generate an average encoded frame size for the cell of a size comparable to the map-wide average encoded frame size. The per-cell encoder quality settings may be normalized by the map-wide average encoder quality setting, exemplarily in accordance with Equation (6) below.

$$\text{normalized encoder quality setting} = \frac{\text{encoder quality setting}}{\sum_{cells} \frac{\text{encoder quality setting}}{\text{number of cells}}} \quad (6)$$

During video-streaming, the game can pull the normalized encoder quality setting from the heatmap cell corresponding to the current player position and use it to hint the encoder by sending a quality setting override. As explained above, in certain embodiments, the H.264 standard-compliant library ffmpeg running in Constant Rate Factor (CRF) mode will accept an override quantization parameter value on the command line using the –crf switch to hint the encoder. An exemplarily heatmap, from which normalized encoder quality settings may be extracted, is shown in FIG. 8.

As the encoder quality settings are normalized, they can be combined from multiple sources, such as a spatially related sequence and a temporally related sequence, during the preparation step described by "Find Pre-Generated Encoder Settings for Game Sequence," step 402, in FIG. 4. The normalized values can be multiplied together before this step to generate an encoder quality setting that implicitly accounts for the effects on the encoded video bitrate from each source sequence. For example, the player's location is used to read a pre-generated normalized encoder quality setting from a heatmap and the player's weapon produces a firing sequence that has a time-series pre-generated normalized encoder quality setting. These two normalized values are multiplied together during the preparation step to incorporate the effect of player location and weapon choice on the encoded video bitrate.

The foregoing description and drawings should be considered as illustrative only of the principles of the invention. The invention is not intended to be limited by the preferred embodiment and may be implemented in a variety of ways that will be clear to one of ordinary skill in the art. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

The invention claimed is:
1. A computer-implemented method for encoder hinting comprising the steps of:
monitoring for information related to changes in frame rendering of a live-streaming application;

calculating tolerance boundaries, rolling average frame time, and short-term trends in frame time, wherein said calculations are used to identify a frame time peak in video data; and hinting an encoder to modulate the quality settings of frame output of the video data in proportion to the size of the frame time peak.

2. The method of claim 1, wherein the calculations of tolerance boundaries, rolling average frame time, and short-term trends in frame time are used to identify high-entropy frames.

3. The method of claim 1, further calculating a quality scaling value for a frame time outside of the tolerance boundaries, wherein said calculation is used to hint the encoder.

4. The method of claim 1, wherein the tolerance boundaries are calculated by profiling.

5. The method of claim 1, wherein the monitored information may be one or more of a message, a calculated result, an outcome, or a discretely measurable value that occurs during the runtime rendering process.

6. The method of claim 1, wherein the monitoring involves frame peak detection during a rendering process.

7. The method of claim 6, wherein the monitoring further involves detecting each frame's rendering time to identify unusually long or unusually short frame times.

8. The method of claim 1, further comprising the step of using the correlation between rendering time and image entropy to calculate the effect of the monitored information on the bitrate of the video data.

9. The method of claim 1, further comprising the step of using a rolling average in signal processing and statistical analysis to identify short-term outliers while accounting for long-term trends in order to calculate the effect of the monitored information on the bitrate of the video data.

10. The method of claim 1, further comprising the step of using a measured frame time from the current frame, a measured frame times from some number of previous frames, and/or a runtime encoder quality settings as reported by an encoder to calculate a quality setting value for quality settings of frame output at a renderer.

* * * * *